United States Patent
Li et al.

(10) Patent No.: US 12,326,774 B2
(45) Date of Patent: Jun. 10, 2025

(54) WAKE-UP MECHANISM CONTROLLING METHOD, ELECTRONIC SYSTEM, NON-TRANSITORY COMPUTER READABLE STORAGE MEDIUM

(71) Applicant: Realtek Semiconductor Corporation, Hsinchu (TW)

(72) Inventors: Yang Li, Jiangsu Province (CN); Fu-Juan Cen, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 119 days.

(21) Appl. No.: 18/488,992

(22) Filed: Oct. 17, 2023

(65) Prior Publication Data
US 2024/0211024 A1 Jun. 27, 2024

(30) Foreign Application Priority Data
Dec. 27, 2022 (CN) .......................... 202211687067.8

(51) Int. Cl.
*G06F 1/32* (2019.01)
*G06F 1/3206* (2019.01)
*G06F 1/3296* (2019.01)

(52) U.S. Cl.
CPC .......... *G06F 1/3296* (2013.01); *G06F 1/3206* (2013.01)

(58) Field of Classification Search
CPC .............................. G06F 1/3296; G06F 1/3206
See application file for complete search history.

(56) References Cited

U.S. PATENT DOCUMENTS

| | | | | |
|---|---|---|---|---|
| 2016/0085563 A1* | 3/2016 | Jan | ......................... | G06F 9/4418 713/1 |
| 2019/0266315 A1* | 8/2019 | Li | ...................... | G06V 40/1365 |
| 2020/0326768 A1* | 10/2020 | Wahl | ..................... | G06F 1/1694 |

FOREIGN PATENT DOCUMENTS

TW 201502960 A 1/2015

OTHER PUBLICATIONS

Fa-Long Luo, Ward Williams, and Bruce Gladstone, "BAPCO MobileMark® 25 User Guide", Business Applications Performance Corporation, Sep. 2021. https://bapco.com/wp-content/uploads/2021/09/bapco_screen_calibration_user_guide_v1.1.pdf.
Technical Support, "What is Modern Standby", Microsoft, Mar. 3, 2021. https://learn.microsoft.com/en-us/windows-hardware/design/device-experiences/modern-standby.

* cited by examiner

*Primary Examiner* — Stefan Stoynov
(74) *Attorney, Agent, or Firm* — CKC & Partners Co., LLC

(57) ABSTRACT

A wake-up mechanism controlling method includes following operations: performing, by a processor of an electronic device, an initialization process for a driver program of a login device; controlling, by the processor, the login device to be in a low-power mode and to support a wake-up mechanism when the electronic device is in a first state, in which the login device is configured to log into an operating system of the electronic device when the login device is waken up; and controlling, by the processor, the login device to be in the low-power mode and not to support the wake-up mechanism when the electronic device is in a second state.

20 Claims, 2 Drawing Sheets

WAKE-UP MECHANISM CONTROLLING METHOD, ELECTRONIC SYSTEM, NON-TRANSITORY COMPUTER READABLE STORAGE MEDIUM

RELATED APPLICATIONS

This application claims priority to Chinese Application Serial Number 202211687067.8, filed Dec. 27, 2022, which is herein incorporated by reference.

BACKGROUND

Technical Field

The present disclosure relates to wake-up mechanism technology. More particular, the present disclosure relates to a wake-up mechanism controlling method, an electronic system, and a non-transitory computer readable storage medium.

Description of Related Art

With developments of technology, various electronic devices have been developed. In practical applications, some electronic devices can be logged in through a login device. However, for saving power, the login device is in a low-power mode under some conditions to wait to be waken up. However, this may cause false touch wake-up problems.

SUMMARY

Some aspects of the present disclosure are to provide a wake-up mechanism controlling method. The wake-up mechanism controlling method includes following operations: performing, by a processor of an electronic device, an initialization process for a driver program of a login device; controlling, by the processor, the login device to be in a low-power mode and to support a wake-up mechanism when the electronic device is in a first state, in which the login device is configured to log into an operating system of the electronic device when the login device is waken up; and controlling, by the processor, the login device to be in the low-power mode and not to support the wake-up mechanism when the electronic device is in a second state.

Some aspects of the present disclosure are to provide an electronic system. The electronic system includes a login device and an electronic device coupled to the login device. The electronic device includes a processor. The processor is configured to perform an initialization process for a driver program of the login device. The processor controls the login device to be in a low-power mode and to support a wake-up mechanism when the electronic device is in a first state. The login device is configured to log into an operating system of the electronic device when the login device is waken up. The processor further controls the login device to be in the low-power mode and not to support the wake-up mechanism when the electronic device is in a second state.

Some aspects of the present disclosure are to provide a non-transitory computer readable storage medium storing a computer program including a plurality of instructions. When a processor in an electronic device executes the plurality of instructions, the processor performs following operations: performing an initialization process for a driver program of a login device; controlling the login device to be in a low-power mode and to support a wake-up mechanism when the electronic device is in a first state, in which the login device is configured to log into an operating system of the electronic device when the login device is waken up; and controlling the login device to be in the low-power mode and not to support the wake-up mechanism when the electronic device is in a second state.

As described above, in the present disclosure, the login device can support the wake-up mechanism or not support the wake-up mechanism in different states. Accordingly, it can achieve power saving and avoid false touch wake-up problems at the same time.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
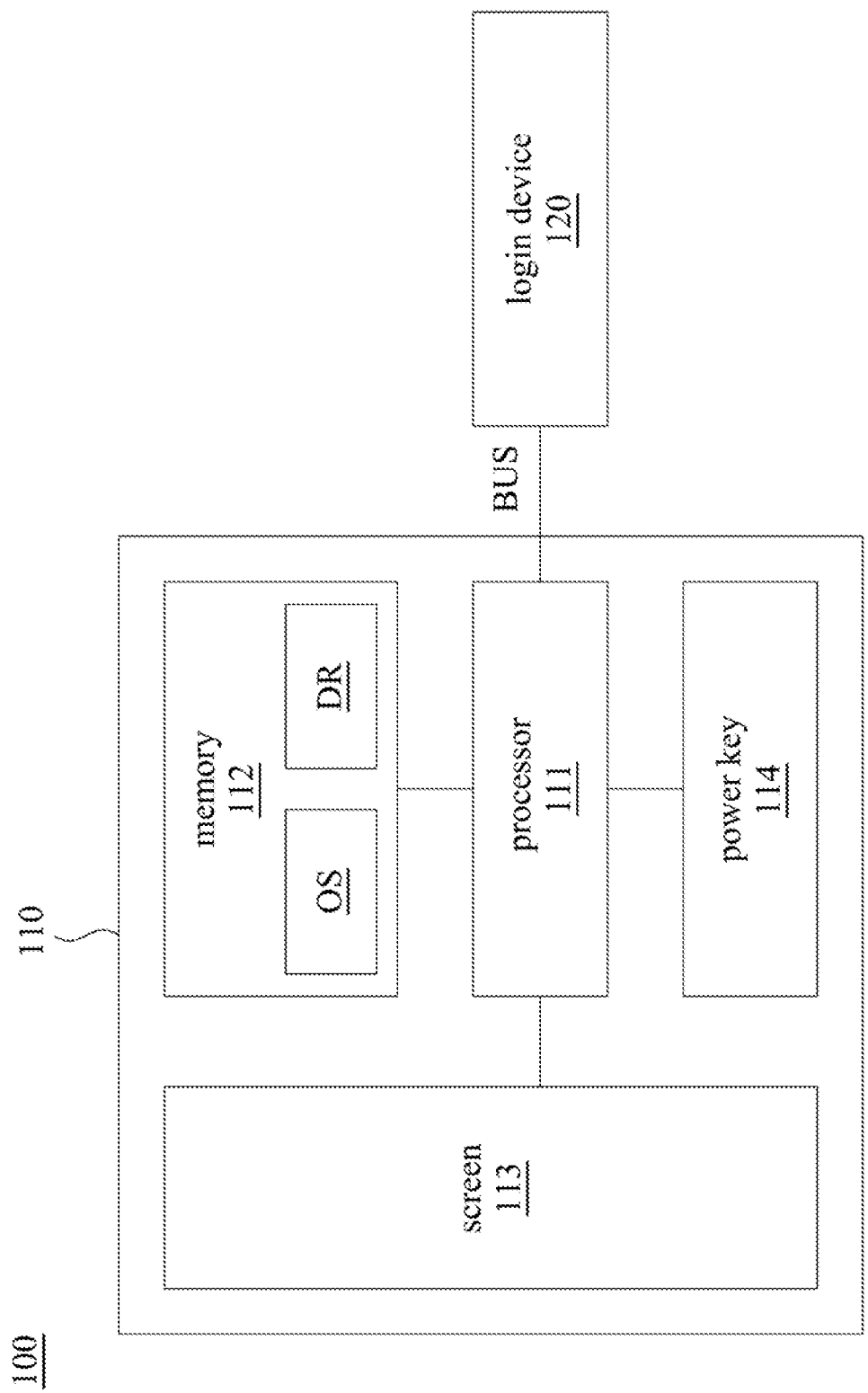
FIG. 1 is a schematic diagram of an electronic system according to some embodiments of the present disclosure.

Reference is made to FIG. 1. FIG. 1 is a schematic diagram of an electronic system 100 according to some embodiments of the present disclosure.

As illustrated in FIG. 1, the electronic system 100 includes an electronic device 110 and a login device 120. The login device 120 is coupled to the electronic device 110. In some embodiments, the login device 120 can be coupled to the electronic device 110 through a universal serial bus BUS. The login device 120 can be used to login into an operating system OS of the electronic device 110.

In some embodiments, the electronic device 110 can be a personal desktop computer, a notebook computer, a tablet computer, or other devices with similar functions. The login device 120 can be a fingerprint reader, a keyboard, or other input devices with similar functions.

In practical applications, the login device 120 can be externally connected to the electronic device 110 or be integrated into the electronic device 110.

As illustrated in FIG. 1, the electronic device 110 includes a processor 111, a memory 112, a screen 113, and a power key 114. The processor 111 is coupled to the memory 112, the screen 113, the power key 114, and the login device 120.

In some embodiments, the processor 111 can be a central processing unit, a microprocessor, or other circuits with similar functions.

In some embodiments, the memory 112 can be implemented by a non-transitory computer readable storage medium. The non-transitory computer readable storage medium is, for example, a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains. The memory 112 can store the operating system OS and a driver program DR of the login device 120. The operating system OS can include a program and this program can include instructions. The processor 111 can execute the instructions to perform a wake-up mechanism controlling method 200 in FIG. 2.

In some embodiments, the screen 113 can be a display panel installed in the electronic device 110 or externally connected to the electronic device 110. In some embodiments, the screen 113 can be integrated with a touch panel into a single component to form a touch display panel in the electronic device 110.

In some embodiments, the power key 114 can be a power key on the personal desktop computer, on the notebook computer, on the tablet computer, or on other device with similar functions.

Figure 2:
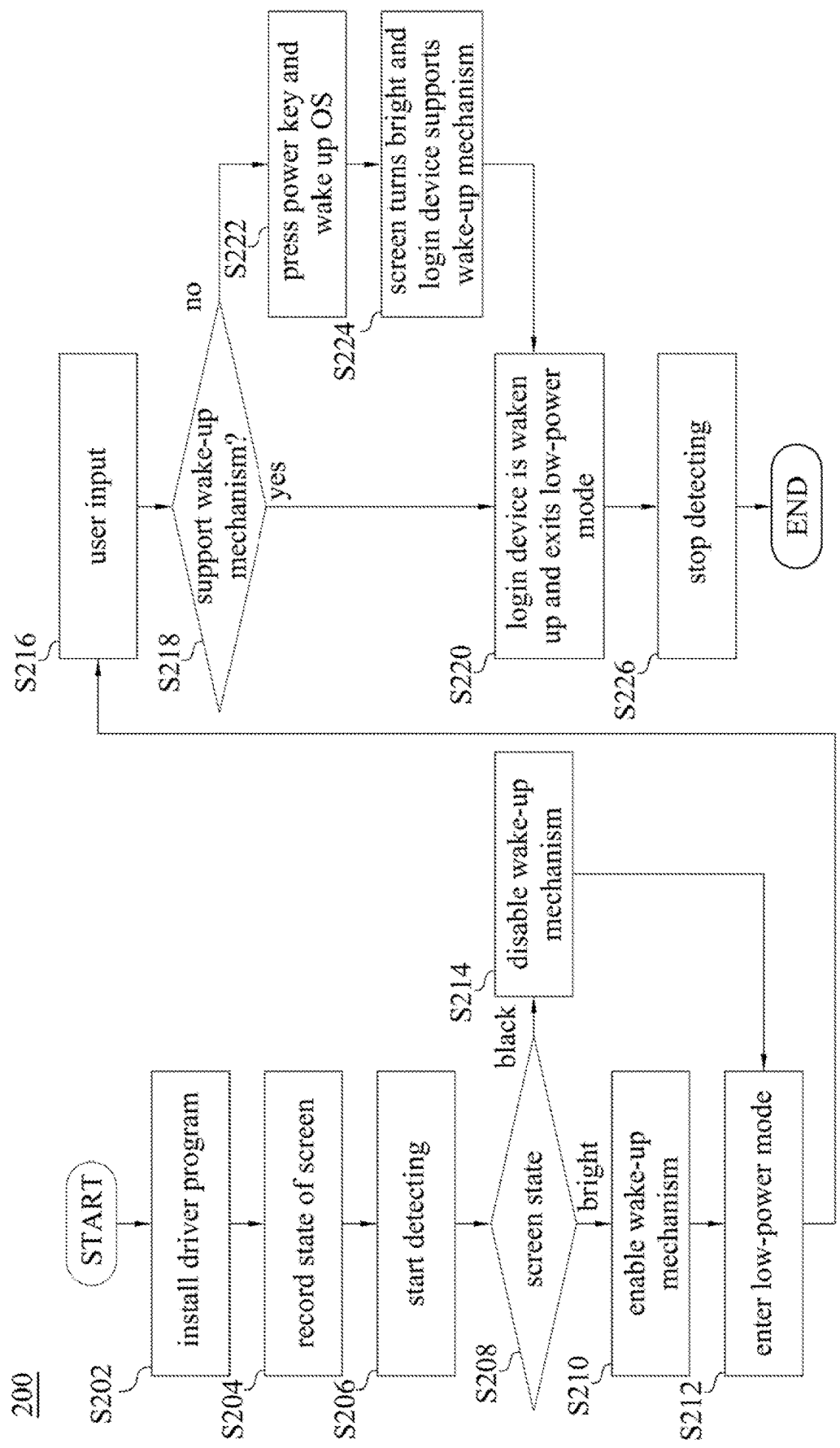
FIG. 2 is a flow diagram of a wake-up mechanism controlling method according to some embodiments of the present disclosure.

References are made to FIG. 1 and FIG. 2. FIG. 2 is a flow diagram of the wake-up mechanism controlling method 200 according to some embodiments of the present disclosure.

For better understanding, the wake-up mechanism controlling method 200 is described with reference to the electronic system 100 in FIG. 1 in following paragraphs, and it takes the electronic device 110 being a notebook computer and the login device 120 being a fingerprint reader as an example. However, the present disclosure is not limited thereto.

As illustrated in FIG. 2, the wake-up mechanism controlling method 200 includes operation S202, operation S204, operation S206, operation S208, operation S210, operation S212, operation S214, operation S216, operation S218, operation S220, operation S222, operation S224, and operation S226.

In operation S202, the processor 111 installs the driver program DR of the login device 120 in the memory 112, and performs an initialization process for the driver program DR. In the example of the electronic device 110 being the notebook computer and the login device 120 being the fingerprint reader, the processor 111 in the notebook computer can install the driver program DR of the fingerprint reader in the memory 112 in the notebook computer and perform the initialization process for the driver program DR. At this time, a power strategy of the fingerprint reader is an Idle Universal Serial Bus (USB) Selective Suspend strategy.

In operation S204, the processor 111 records a state of the screen 113. In the example of the electronic device 110 being the notebook computer and the login device 120 being the fingerprint reader, the processor 111 in the notebook computer can record the state of the screen 113 in the notebook computer. For example, when the notebook computer is in a screen lock state, the screen 113 in the notebook computer can be in a bright state (the screen 113 is turned on) and display a user login-in image. At this time, the operating system OS is in a normal work state. In other words, the operating system OS does not enter a sleep state. However, when the notebook computer is in a modern standby state, the screen 113 in the notebook computer can be in a black state (the screen 113 is turned off). At this time, the operating system OS enters the sleep state.

In operation S206, the processor 111 starts to detect the input behavior on the login device 120. In the example of the electronic device 110 being the notebook computer and the login device 120 being the fingerprint reader, the processor 111 in the notebook computer can start to detect whether there is a fingerprint input on the fingerprint reader.

In operation S208, the processor 111 determines the state of the screen 113. In the example of the electronic device 110 being the notebook computer and the login device 120 being the fingerprint reader, as described above, the screen 113 in the notebook computer can be in the bright state when the notebook computer is in the screen lock state. At this time, the wake-up mechanism controlling method 200 enters operation S210.

In operation S210, the processor 111 enables the wake-up mechanism of the login device 120. In the example of the electronic device 110 being the notebook computer and the login device 120 being the fingerprint reader, when the notebook computer is in the screen lock state (the screen 113 is in the bright state), the processor 111 in the notebook computer can enable the wake-up mechanism of the login device 120. In other words, the fingerprint reader can enter the low-power mode and can be waken up under some specific conditions (supporting the wake-up mechanism).

In operation S212, the login device 120 enters the low-power mode. In the example of the electronic device 110 being the notebook computer and the login device 120 being the fingerprint reader, when there is no fingerprint input on the fingerprint reader for a period of time, the fingerprint reader enters the low-power mode for saving power. In addition, when the notebook computer is in the modern standby state (the screen 113 is the black state), the power strategy of the fingerprint reader is kept as the Idle USB Selective Suspend strategy, but the present disclosure is not thereto.

In operation S208, when the notebook computer is in the modern standby state, the screen 113 in the notebook computer can be in the black state. At this time, the wake-up mechanism controlling method 200 enters operation S214.

In operation S214, the processor 111 disables the wake-up mechanism of the login device 120. In the example of the electronic device 110 being the notebook computer and the login device 120 being the fingerprint reader, when the notebook computer is in the modern standby state (the screen 113 is the black state), the processor 111 in the notebook computer can disable the wake-up mechanism of the fingerprint reader. In other words, the fingerprint reader can enter the low-power mode but cannot be waken up (not supporting the wake-up mechanism).

Then, the wake-up mechanism controlling method 200 enters operation S212. In operation S212, the login device 120 enters the low-power mode. In the example of the electronic device 110 being the notebook computer and the login device 120 being the fingerprint reader, when the notebook computer is in the modern standby state (the screen 113 is the black state), the power strategy of the fingerprint reader is adjusted to be an Idle Cannot Wake from S0 strategy, but the present disclosure is not thereto.

In practical applications, the Idle USB Selective Suspend strategy and the Idle Cannot Wake from S0 strategy belong to the low-power mode (D2 mode) of the device.

Then, in operation S216, the user performs an input operation. In the example of the electronic device 110 being the notebook computer and the login device 120 being the fingerprint reader, the user can press a fingerprint on the fingerprint reader.

Operation S218 is for determining whether the login device 120 supports the wake-up mechanism. In the example of the electronic device 110 being the notebook computer and the login device 120 being the fingerprint reader, as described above, when the notebook computer is in the screen lock state (the screen 113 is in the bright state), the fingerprint reader enters the low-power mode and supports the wake-up mechanism. Thus, the wake-up mechanism controlling method 200 enters operation S220.

In operation S220, the login device 120 is waken up and exits from the low-power mode. In the example of the electronic device 110 being the notebook computer and the login device 120 being the fingerprint reader, since the fingerprint reader supports the wake-up mechanism (operation S210) in the screen lock state (the screen 113 is in the bright state) and the user presses the fingerprint on the fingerprint reader (operation S216), the fingerprint reader can be waken up, exit from the low-power mode, and enter the normal work mode. At this time, the system is unlocked by the fingerprint collected in operation S216 (the operating system OS is logged in).

In operation S218, in the example of the electronic device 110 being the notebook computer and the login device 120 being the fingerprint reader, when the notebook computer is in the modern standby state (the screen 113 is the black state), the fingerprint reader enters the low-power mode but does not support the wake-up mechanism (operation S214). Then, the wake-up mechanism controlling method 200 enters operation S222.

In operation S222, the processor 111 controls the operating system OS to be waken up in response an operation on the power key 114. In the example of the electronic device 110 being the notebook computer and the login device 120 being the fingerprint reader, as described above, when the notebook computer is in the modern standby state (the screen 113 is the black state), the operating system OS is in the sleep state and the fingerprint reader does not support the wake-up mechanism. Since the fingerprint reader does not support the wake-up mechanism, the user can press the power key 114 on the notebook computer to wake up the operating system OS in the notebook computer such that the operating system OS in the notebook computer enters the normal work state from the sleep state.

In operation S224, the screen 113 turns into the bright state and the login device 120 supports the wake-up mechanism. In the example of the electronic device 110 being the notebook computer and the login device 120 being the fingerprint reader, the user presses the power key 114 on the notebook computer to wake up the operating system OS in the notebook computer, the operating system OS enters the normal work state from the sleep state, and the screen 113 in the notebook computer returns from the black state to the bright state. In addition, the power strategy of the fingerprint reader returns from the Idle Cannot Wake from S0 strategy to the Idle USB Selective Suspend strategy, and the fingerprint reader supports the wake-up mechanism. At this time, the login device 120 is waken up and exits the low-power mode (operation S220) and the system is unlocked by the fingerprint collected in operation S216 (the operating system OS is logged in).

In operation S226, the processor 111 stops detecting the input behavior on the login device 120. In the example of the electronic device 110 being the notebook computer and the login device 120 being the fingerprint reader, the processor 111 in the notebook computer can stop detecting whether there is a fingerprint input on the fingerprint reader.

In some related approaches, when the electronic device is in the screen lock state and the modern standby state, the login device does not enter the low-power mode and does not support the wake-up mechanism. In this situation, a processor in the electronic device needs to perform polling operation continuously to detect whether there is a corresponding input on the login device. However, not only the login device cannot enter the low-power mode, but also continuous polling by the processor also consumes additional power. Accordingly, these related approaches are unable to saving power.

In some other related approaches, when the electronic device is in the screen lock state and the modern standby state, the login device enters the low-power mode and supports the wake-up mechanism. In this situation, the login device may waken up by false touch in the modern standby state, resulting in poor user experience.

Compared to the related approaches above, the login device 120 of the present disclosure supports the wake-up mechanism in the screen lock state, and does not support the wake-up mechanism in the modern standby state. Thus, it can achieve power saving and avoid false touch wake-up problems at the same time. In addition, the present disclosure can be applied to not only high-level hardware, but also low-level hardware.

In some other embodiments, the login device 120 may not be the fingerprint reader. For example, the login device 120 may be a keyboard, a mouse, or other input device.

As described above, in the present disclosure, the login device can support the wake-up mechanism or not support the wake-up mechanism in different states. Accordingly, it can achieve power saving and avoid false touch wake-up problems at the same time.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wake-up mechanism controlling method, comprising:
    performing, by a processor of an electronic device, an initialization process for a driver program of a login device;
    controlling, by the processor, the login device to be in a low-power mode and to support a wake-up mechanism when the electronic device is in a first state, wherein the login device is configured to log into an operating system of the electronic device when the login device is waken up; and
    controlling, by the processor, the login device to be in the low-power mode and not to support the wake-up mechanism when the electronic device is in a second state.

2. The wake-up mechanism controlling method of claim 1, wherein the first state is a screen lock state, wherein the second state is a modern standby state.

3. The wake-up mechanism controlling method of claim 1, wherein a screen of the electronic device is in a bright state when the electronic device is in the first state, wherein the screen is in a black state when the electronic device is in the second state.

4. The wake-up mechanism controlling method of claim 1, wherein the operating system is in a normal work state when the electronic device is in the first state, wherein the operating system is in a sleep state when the electronic device is in the second state.

5. The wake-up mechanism controlling method of claim 1, further comprising:
    entering, by the operating system, a sleep state when the electronic device is in the second state; and
    controlling, by the processor, the operating system to enter a normal work state from the sleep state in response to an operation on a power key.

6. The wake-up mechanism controlling method of claim 5, further comprising:

controlling, by the processor, a screen of the electronic device to enter a bright state from a black state when the operating system enters the normal work state from the sleep state in response to the operation.

7. The wake-up mechanism controlling method of claim 5, further comprising:
controlling, by the processor, a power strategy of the login device to be an idle universal serial bus (USB) selective suspend strategy and the login device to support the wake-up mechanism when the operating system enters the normal work state from the sleep state in response to the operation.

8. The wake-up mechanism controlling method of claim 7, further comprising:
waking up the login device according to an input on the login device when the login device supports the wake-up mechanism such that the login device exits from the low-power mode.

9. An electronic system, comprising:
a login device; and
an electronic device coupled to the login device and comprising:
a processor configured to perform an initialization process for a driver program of the login device,
wherein the processor controls the login device to be in a low-power mode and to support a wake-up mechanism when the electronic device is in a first state, wherein the login device is configured to log into an operating system of the electronic device when the login device is waken up,
wherein the processor further controls the login device to be in the low-power mode and not to support the wake-up mechanism when the electronic device is in a second state.

10. The electronic system of claim 9, wherein the first state is a screen lock state, wherein the second state is a modern standby state.

11. The electronic system of claim 9, wherein the electronic device further comprises:
a screen coupled to the processor, wherein the screen is in a bright state when the electronic device is in the first state, wherein the screen is in a black state when the electronic device is in the second state.

12. The electronic system of claim 9, wherein the operating system is in a normal work state when the electronic device is in the first state, wherein the operating system is in a sleep state when the electronic device is in the second state.

13. The electronic system of claim 9, wherein the operating system is in a sleep state when the electronic device is in the second state, wherein the processor is further configured to control the operating system to enter a normal work state from the sleep state in response to an operation on a power key.

14. The electronic system of claim 13, wherein the processor is further configured to control a screen of the electronic device to enter a bright state from a black state when the operating system enters the normal work state from the sleep state in response to the operation.

15. The electronic system of claim 13, wherein the processor is further configured to control a power strategy of the login device to be an idle universal serial bus (USB) selective suspend strategy and the login device to support the wake-up mechanism when the operating system enters the normal work state from the sleep state in response to the operation.

16. The electronic system of claim 15, wherein the login device is waken up according to an input on the login device when the login device supports the wake-up mechanism such that the login device exits from the low-power mode.

17. The electronic system of claim 9, wherein the login device is a fingerprint reader.

18. The electronic system of claim 17, wherein the fingerprint reader is coupled to the electronic device through a universal serial bus.

19. The electronic system of claim 17, wherein the fingerprint reader is integrated in the electronic device.

20. A non-transitory computer readable storage medium storing a computer program comprising a plurality of instructions, wherein when a processor in an electronic device executes the plurality of instructions, the processor performs following operations:
performing an initialization process for a driver program of a login device;
controlling the login device to be in a low-power mode and to support a wake-up mechanism when the electronic device is in a first state, wherein the login device is configured to log into an operating system of the electronic device when the login device is waken up; and
controlling the login device to be in the low-power mode and not to support the wake-up mechanism when the electronic device is in a second state.

* * * * *